United States Patent [19]

Koch

[11] Patent Number: 4,974,503
[45] Date of Patent: Dec. 4, 1990

[54] APPARATUS FOR IRRADIATING FOOD PRODUCTS

[75] Inventor: Klaus Koch, Laatzen, Fed. Rep. of Germany

[73] Assignee: Hermann Berstorff Maschinenbau GmbH, Hanover, Fed. Rep. of Germany

[21] Appl. No.: 521,381

[22] Filed: May 10, 1990

[30] Foreign Application Priority Data

Jan. 18, 1990 [DE] Fed. Rep. of Germany ....... 4001318

[51] Int. Cl.$^5$ .......................... A23L 3/04; A23L 3/32; H05B 6/78
[52] U.S. Cl. .................... 99/451; 99/443 C; 99/477; 99/483; 99/DIG. 14; 219/10.55 A; 219/10.55 F
[58] Field of Search ................. 99/358, 443 R, 443 C, 99/451, 467, 477–479, 483, DIG. 14; 219/10.55 A, 10.55 M, 10.55 E, 10.55 R, 10.55 F; 426/234, 235, 241; 34/1

[56] References Cited

U.S. PATENT DOCUMENTS

| 3,961,569 | 6/1976 | Kenyon et al. | 99/451 |
| 4,343,979 | 8/1982 | Barbini et al. | 99/451 |
| 4,444,723 | 4/1984 | Matsumaru et al. | 219/10.55 A |
| 4,468,865 | 9/1984 | Inagaki | 34/1 |
| 4,570,045 | 2/1986 | Jeppson | 219/10.55 A |
| 4,687,895 | 8/1987 | Chitre et al. | 426/241 |
| 4,808,782 | 2/1989 | Nakagawa et al. | 426/235 |

FOREIGN PATENT DOCUMENTS

| 0128397 | 12/1984 | European Pat. Off. |
| 3432341 | 9/1984 | Fed. Rep. of Germany . |
| 3806816 | 3/1988 | Fed. Rep. of Germany . |
| 3721762 | 7/1988 | Fed. Rep. of Germany ........ 99/451 |
| 3834574 | 8/1989 | Fed. Rep. of Germany . |

Primary Examiner—Timothy F. Simone
Attorney, Agent, or Firm—Foley & Lardner, Schwartz, Jeffery, Schwaab, Mack, Blumentahl & Evans

[57] ABSTRACT

An apparatus is provided for uniformly and rapidly heating, pasteurizing and/or sterilizing food products which comprises a conveyor on which the food products are conveyed and a source of radio-frequency radiation which is directed at the food products. The source is connected to shaped electrodes, the shaping of the electrodes and their spacing from the food product being selected in dependence upon the configuration and irradiation required of the product being treated. The food product may be a pre-cooked meal comprising a plurality of constituents and the electrode is then shaped to take into account the geometry of the different constituents and in combination with the spacing of the electrode from the product, takes the heating requirements of the individual components into account.

13 Claims, 4 Drawing Sheets

APPARATUS FOR IRRADIATING FOOD PRODUCTS

FIELD OF THE INVENTION

The present invention relates to an apparatus for irradiating food products. More particularly, the present invention relates to an apparatus for irradiating food products which will cause the products to be pasteurised, sterilized or uniformly and rapidly heated.

BACKGROUND OF THE INVENTION AND PRIOR ART DISCUSSION

Apparatuses are known in which food products are disposed in closed or open containers which are permeable to high-frequency radiation. The containers are located on an endless conveyor belt which conveys them through an elongate treatment chamber. High-frequency radiation emitters are introduced into the treatment chamber from above and below, that is to say, perpendicularly to the longitudinal axis of the chamber. Temperature sensors are disposed both upstream and downstream of the emitters. These sensors are connected to a computer, which latter is also connected to the conveyor belt arrangement so that, effectively, the amount of irradiation received by the food products is controlled.

German Patent Specification No. DE 3432341 discloses pasteurising apparatus, which is generally of the above-described type and in which microwaves are used as the high-frequency radiation. The irradiation treatment is carried out in three sequential treatment chambers and the microwave energy is reduced, in a stepwise manner, as the three chambers are successively traversed by the food. If the product to be treated is, for example, a pre-cooked meal and is to be subjected to a pasteurising process, it is very important to achieve a uniform temperature for all of the constituents of the meal. It is very difficult to meet this requirement, because each individual constituent requires a different amount of heat to achieve a uniform temperature.

In the prior art methods, the standard treatment temperature of the product has been taken as that of the constituent which first reaches its pasteurising temperature. The upper treatment temperature limit is the temperature which cannot be exceeded if harm to one or more constituents by excessive heating is to be avoided. In such circumstances, it often occurs that some components of the meal, such as meat in gravy, do not, in fact, reach their pasteurising temperature. This is because any further increase in the overall temperature, which would be necessary to pasteurise the meat and gravy components would necessarily have caused the other constituents of the meal to be harmed.

In German Patent Application No. P38 34 574.9-45 another apparatus of the above-described general type is disclosed. In such apparatus temperature sensors, which measure the temperature of the individual components in the containers are disposed immediately upstream of each supply conduit of a microwave emitter. The supply conduit projects vertically into the treatment chamber either from below or from above the conveyor belt. A computer compares the measured temperatures with stored characteristic values specific to the products and the output of each microwave emitter is controlled in dependence upon the comparative figures.

German Patent Specification No. DE 3 806 816 also discloses an apparatus for pasteurising or sterilising food utilising microwaves. The microwave emitters used in such apparatus are microwave generators which communicate with supply conduits, which latter define the particular microwave beam. In such a case, the geometry of the configuration of the cross-sectional area of the discharge aperture of the microwave supply conduits corresponds substantially to the projection geometry of the products to be treated when viewed in the direction of the conveyor belt.

Finally, European Patent Specification No. 0 128 397 discloses a capacitive high-frequency continuous heating oven, wherein products which are relatively long but not very thick, such as textile webs may be heated in a particularly advantageous manner. The continuous heating oven disclosed in such specification comprises a high-frequency generator, which induces vertically adjustable plate or extrusion electrodes to produce electromagnetic waves having a frequency in the range of, for example, 30 MHz. In addition, an earthed counter-electrode is provided, which comprises a grid of earthed stray field electrodes, which are disposed vertically relative to the direction of conveyance of the web.

The prior art apparatuses which utilise ultrahigh-frequency technology, that is to say, microwave technology are disadvantageous on the ground of costs, because one microwave emitter has to be provided at each irradiation position. In addition, the microwave radiation lobe can generally only be adjusted to the projection geometry of the product by screening-off areas which are not to be irradiated.

A known apparatus for heating products by means of a source of high-frequency radiation is in fact produced more simply and more economically by utilising emitter technology. However, it is not suitable for the differentiated irradiation adapted to the geometry and the constants of the constituents of a product because a radiation field having a substantially rectangular, flat cross-section is produced.

OBJECT OF THE INVENTION

The present invention seeks to provide an apparatus, which permits heating, pasteurising or sterilising of products to be effected more economically and in a more uniform manner than is the case with the prior art. Furthermore, the present invention seeks to provide an apparatus which is capable of better adaptability to the partial products.

SUMMARY OF THE INVENTION

According to the present invention, there is provided an apparatus for the heat-treatment of food products comprising an elongate treatment chamber, said chamber including opposed first and second end regions, endless conveyor means disposed within said chamber, said conveyor means comprising a first run carrying said food products from said first end region of said chamber to said second end region and a second return run and drive means operatively connected to said conveyor means for driving said conveyor means, radio-frequency emitter means disposed within said treatment chamber and extending perpendicularly but spaced from, to, said first conveyor run for directing radio-frequency radiation onto said food products disposed on said first conveyor run, radio-frequency generator means electrically connected to said emitter means, temperature sensor means located adjacent said first conveyor run both upstream and downstream of said emitter means in the direction of travel of said first conveyor run and computer means electrically connected to said conveyor drive means, said generator means and said temperature sensor means for controlling the amount of radiation directed at said food products, wherein said emitter means comprises shaped electrodes, each said shaped electrode having a projection geometry in the direction of said first run of said conveyor means corresponding to the projection geometry of said product to be treated and said vertical spacing of said emitter means from said food products disposed on said first conveyor run is selected in dependence upon a predetermined irradiation power density required by said food product to achieve the desired heat treatment.

By using radio-frequency irradiation in conjunction with such shaped electrodes, the present invention makes it possible to heat-treat food products more especially food products arranged in containers, in a manner which provides an economic alternative to the hitherto used microwave systems. In the present invention, one radio-frequency generator may supply power to twelve shaped electrodes in one radio-frequency treatment chamber, whereas one microwave generator has to be provided at each irradiation position in a treatment chamber which employs microwave radiation.

Furthermore, the geometric configuration of the shaped electrode permits a homogenous irradiation field to be produced, which field is adapted to the geometry of the food product, the product containers and/or the constituents of the food product as desired. Moreover, the irradiation power density to be introduced into the product, can be varied in the present invention by varying the spacing between the electrode surface, or portions thereof, and the product surface.

BRIEF DESCRIPTION OF THE DRAWINGS

Various embodiments of the present invention will be further described, by way of example, with reference to the accompanying drawings, in which.

DESCRIPTION OF PREFERRED EMBODIMENTS

Figure 1:
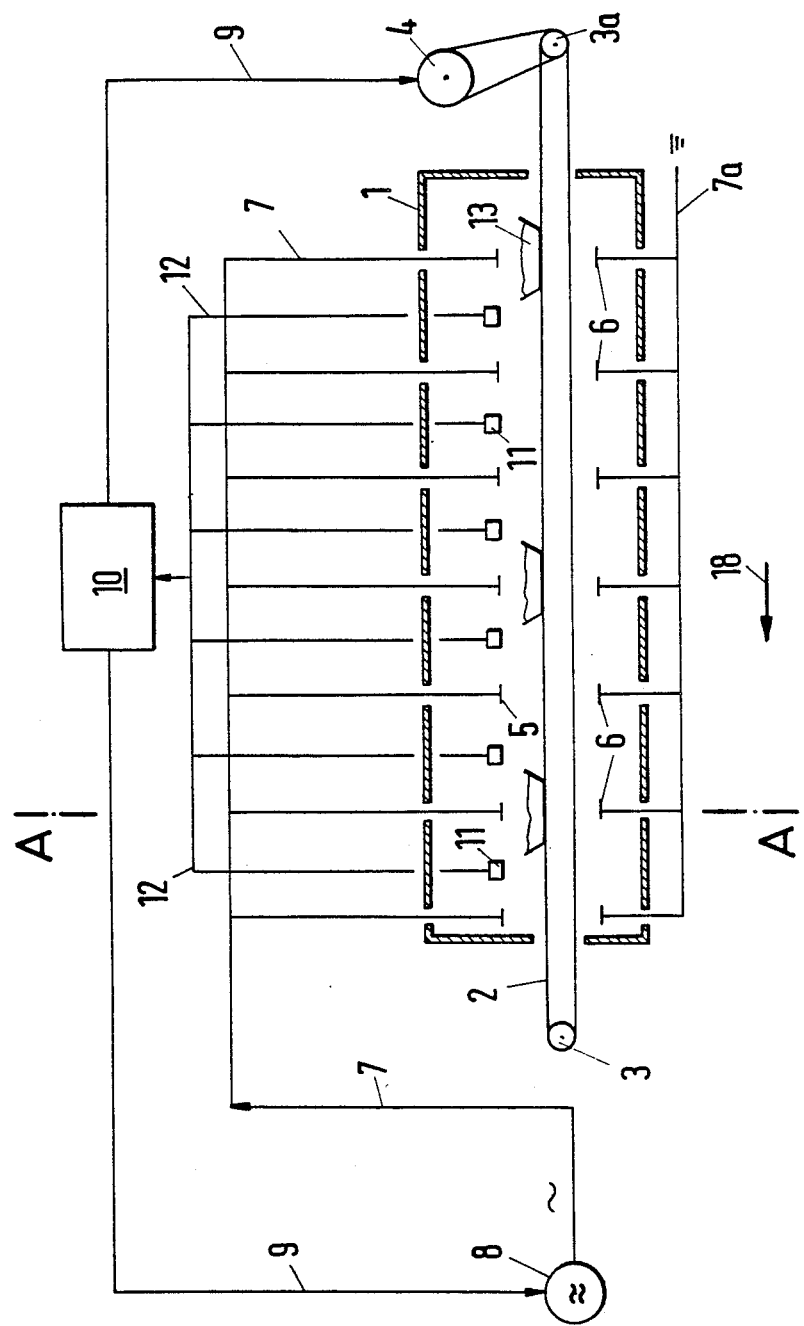
FIG. 1 is a schematic, longitudinal sectional view through an irradiation apparatus utilising radio-frequency radiation in accordance with the present invention.

In FIG. 1, there is shown an irradiation treatment apparatus comprising a treatment chamber 1. Within the chamber 1, an endless conveyor belt 2, which is guided around rollers 3 and 3a is provided. The belt 2 is driven by a drive mechanism 4 connected to the guide roller 3a. The conveyor belt 2 is disposed substantially horizontally and product containers 13 are conveyed on its upper run in the direction of arrow 18.

Shaped electrodes 5 are disposed in the treatment chamber 1 above the conveyor belt 2, and earthed counterelectrodes 6, which are aligned with the shaped electrodes 5, are disposed beneath the conveyor belt 2. When viewed in the direction of conveyance of the containers 13, the pairs of electrodes 5 and 6 are located one behind the other such that each pair of electrodes 5 and 6 defines one product irradiation station.

Temperature sensors 11 are disposed both upstream and downstream of each shaped electrode and are used to determine the temperature of the product or component of the product at each irradiation station. The sensed temperatures are signalled to a computer 10 through the intermediary of a data line 12. The computer 10 serves to compare the measured temperature with material constants specific to the product or component of the product. In dependence upon this comparison, the computer 10 controls the drive of the conveyor belt 2 at predetermined timed intervals, through the intermediary of a control line 9, by acting on the drive mechanism 4. The computer 10 also controls the output of a high-frequency generator 8 within a frequency range of 13 to 440 MHz. Furthermore, the computer is connected to electrode adjustment devices 17 and 19 by further control lines 9 so that the vertical spacing of the shaped electrodes 5 from product being irradiated can be controlled.

Figure 2:
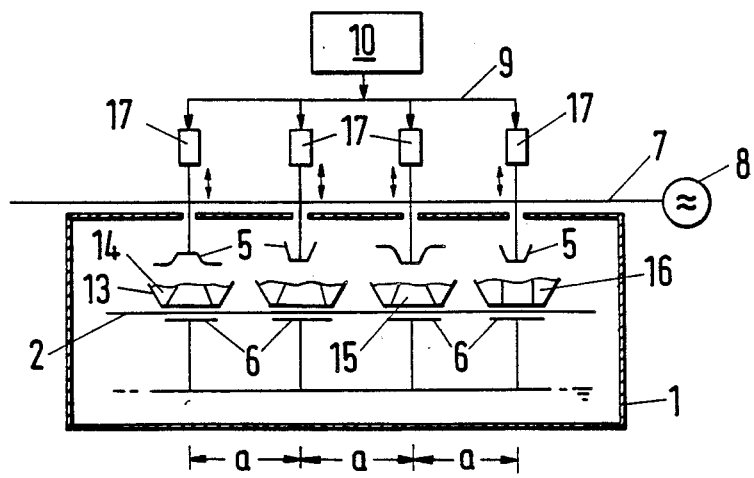
FIG. 2 is a schematic cross-sectional view taken along the line A—A in FIG. 1.

FIG. 2 is a schematic cross-sectional view of the treatment chamber 1 taken at right angles to the direction of travel of the containers 13 taken along the line A—A of FIG. 1. Four product containers 13 are illustrated on the conveyor belt 2 and each such container contains a pre-cooked meal comprising a plurality of constituents 14, 15 and 16. In this particular embodiment, each meal is different to the others. Accordingly, for optimum heat treatment, each meal requires its own individual irradiation field, primarily because of the nature of the individual constituents but also possibly due to disposition of the constituents in the container. Each field is produced by means of the pairs of shaped electrodes 5 and counterelectrodes 6, so that a plurality of different products, in this case, four, may be treated in an optimum manner on a conveyor belt 2. A production programme may be changed rapidly and simply by providing the electrodes 5 and 6 with simple screw or plug connections which makes them readily interchangeable. The dimensions of the moulding electrodes 5, which are determined by the maximum dimensions of the containers, and in consequence their spacing a from one another, are the only features which restrict the ability of the apparatus to handle different containers and products.

Figure 3:
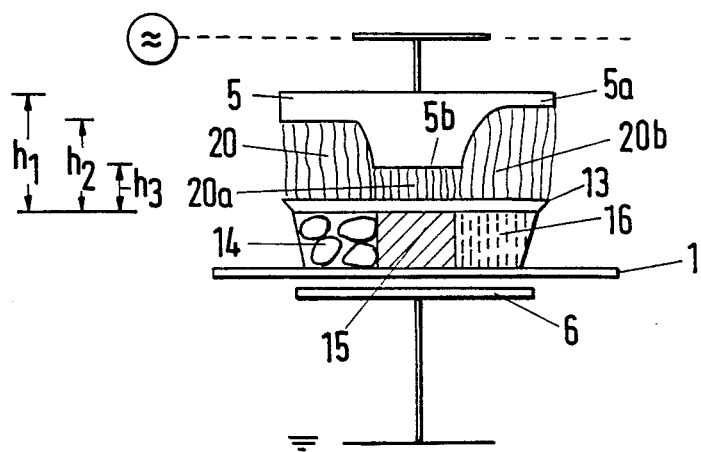
FIG. 3 is a detailed view of part of FIG. 2 and showing one moulding electrode supplying energy to irradiate a container containing different components of a meal.

In FIG. 3, there is shown a pre-cooked meal comprising individual constituents which are potatoes 14, meat and gravy 15 and vegetables 16. Only the irradiation power densities 20, 20a and 20b, which are actually required for optimum treatment are supplied by the shaped electrode 5. This is because the electrode 5 is provided with configuration designed to meet the irradiation requirements of the components making up the product, connected that is to say, the components 14, 15 and 16. Since the radiation power, emanating from the electrode surface decreases with the square of its distance from the surface of the components, the shaped electrode 5 has raised and recessed electrode portions 5a, 5b and 5c when viewed in the direction of the product surface, so that the spacings h, h2, h3, between these portions 5a, 5b and 5c and the surface of the product are such as to produce the particular irradiation power density required by the components 14, 15 and 16 located beneath such electrode portions 5a, 5b and 5c. In addition, the shaped electrode 5, in respect of its projection geometry in the direction of the conveyor belt 2 corresponds substantially to the projection geometry of the partial products 14, 15 and 16 disposed in the containers on the conveyor belt 2.

In a further embodiment, the apparatus further includes an adjustment device for vertically adjusting the shaped electrodes 5, whereby the power output of the electrodes which is to be transferred to the product may be generally varied or may be adapted to the individual filling level of the containers. The adjustment device is actuable either manually or by means of the computer 10 through the intermediary of control lines 9. In a particularly advantageous embodiment of the invention, such adjustment devices includes an adjustment drive mechanism 17 for each moulding electrode 5. Such an arrangement is shown in FIG. 2.

Figure 4:
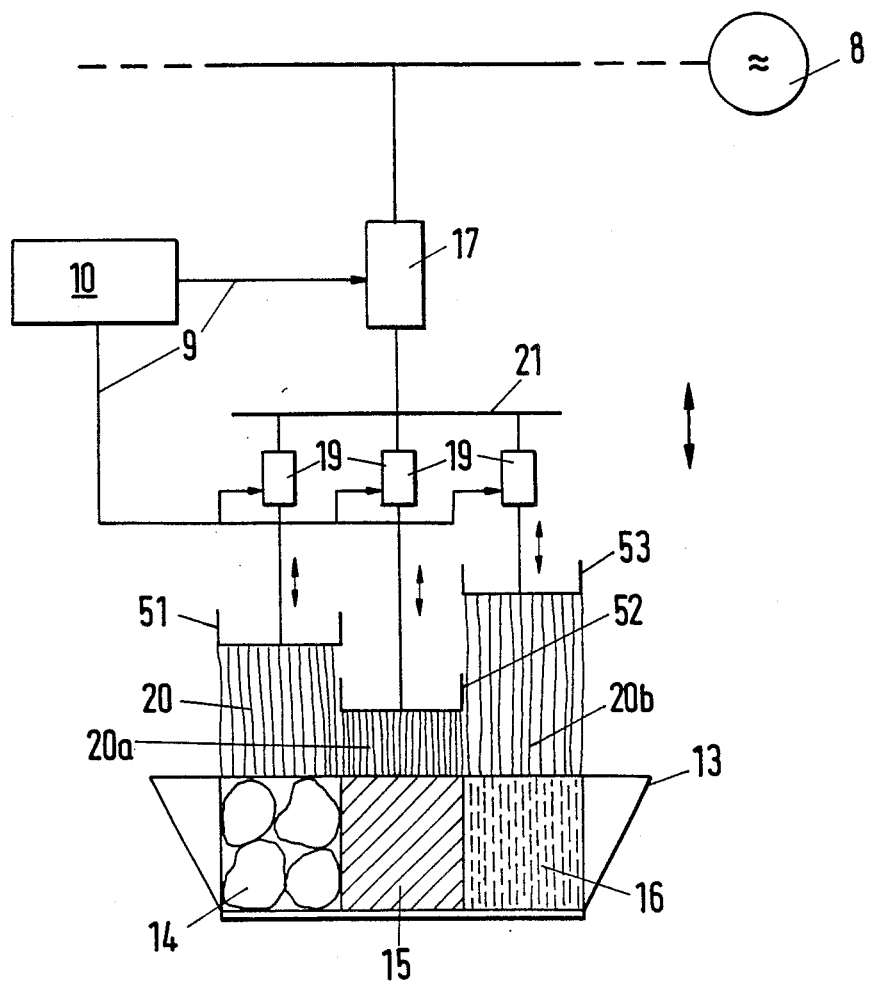
FIG. 4 shows a moulding electrode, similar to that shown in FIGS. 2 and 3 disposed above a container containing different components of a meal, the electrode being vertically adjustable.

In FIG. 4, there is shown an apparatus in which the shaped electrodes 5, only one of which is shown, may be formed from a plurality of individual electrodes 51, 52 and 53. In such a case, each of the electrodes 51, 52 and 53 is aligned with a different one of the components of a meal located in a container 13 therebeneath. The height of each electrode 51, 52, 53 above the particular component of the meal with which it is aligned is adjustable by means of the computer 10 through the intermediary of control lines 9, and also by means of an adjustment drive mechanism 19. Furthermore, the individual electrodes 51, 52 and 53 are mechanically and electrically connected to a moulding electrode base 21, and are jointly adjustable vertically through the intermediary of the adjustment drive mechanism 17.

Figure 5A:
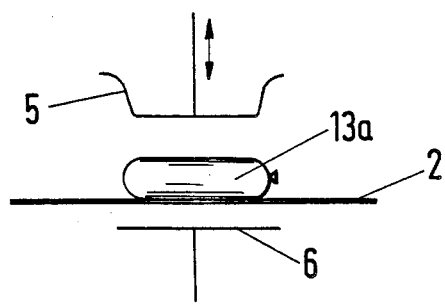
FIG. 5a and FIG. 5b are side elevational and plan views, respectively, of a food product being directly irradiated without being located in a container.
Figure 5B:
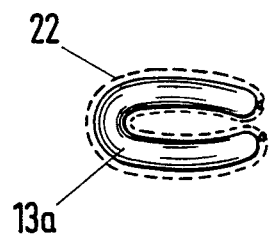

FIG. 5 shows an alternative embodiment, wherein meat in the form of, for example, a sausage 13a which is more than about 30 mm thick, is heat-treated. In such embodiment, no container is used. The projection geometry of the moulding electrodes on the conveyor belt again corresponds substantially to the projection geometry of the product located on the conveyor belt, so that a radiation field having the configuration shown by line 22 is produced. In the case of comparatively thick products, the much greater depth of penetration of high-frequency radiation compared with ultrahigh-frequency radiation such as microwave radiation is particularly noticeable and advantageous.

Whilst one is instructed, whilst heat-treating thick products such as meat or sausages having a thickness of, say 40 mm, to conduct the heat more slowly to the centre of the product, an economic utilisation of the dielectric heating of such foods is only, in fact, if high-frequency radiation is used, due to the great depth of penetration of such radiation into the product. Bilateral microwave heating of the product is not as efficient. Furthermore, the same reasoning also applies to the defrosting and thawing of deep-frozen food which has a thickness greater than 40 mm.

It is a particular advantage of the invention that, in contrast to microwave technology, it is no longer necessary to provide a frequency generator for each irradiation location. However, in one embodiment of the invention, a plurality of moulding electrodes 5 may be combined to form an irradiation unit, which unit is then supplied with power by a high-frequency generator 8.

Finally, in a further variant of the present invention, the counterelectrodes 6 may also be in the form of shaped electrodes, as opposed to having the configuration of a plate or rod electrode.

I claim:

1. An apparatus for the heat-treatment of food products comprising an elongate treatment chamber, said chamber including opposed first and second end regions, endless conveyor means disposed within said chamber, said conveyor means comprising a first run carrying said food products from said first end region of said chamber to said second end region and a second return run and drive means operatively connected to said conveyor means for driving said conveyor means, radio-frequency emitter means disposed within said treatment chamber and extending perpendicularly but spaced from, to, said first conveyor run for directing radio-frequency radiation onto said food products disposed on said first conveyor run, radio-frequency generator means electrically connected to said emitter means, temperature sensor means located adjacent said first conveyor run both upstream and downstream of said emitter means in the direction of travel of said first conveyor run and computer means electrically connected to said conveyor drive means, said generator means and said temperature sensor means for controlling the amount of radiation directed at said food products, wherein said emitter means comprises shaped electrodes, each said shaped electrode having a projection geometry in the direction of said first run of said conveyor means corresponding to the projection geometry of said product to be treated and said vertical spacing of said emitter means from said food products disposed on said first conveyor run is selected in dependence upon a predetermined irradiation power density required by said food product to achieve the desired heat treatment.

2. An apparatus as recited in claim 1 wherein said food product comprises a plurality of different constituents; wherein each said shaped electrode comprises a plurality of shaped portions, each said shaped portion having a projection geometry, in the direction of said first conveyor run, corresponding to the projection geometry of one of said constituents of said food product on said first conveyor run and wherein said vertical spacing of each said shaped portion from said constituent associated therewith is selected in dependence upon said predetermined irradiation power density required by said constituent to achieve said desired heat treatment.

3. An apparatus as recited in claim 1 additionally comprising a container for said food product wherein said radio-frequency radiation emitted by said emitter means directly impinges on said food product contained in said container.

4. An apparatus as recited in claim 1 additionally comprising a container for said food product, said container including a lid portion interposed between said food product and said emitter means, said lid being formed of a radio-frequency radiation permeable material.

5. An apparatus as recited in claim 1, wherein said radio-frequency generator means produces electromagnetic radiation in the range of from 13 to 440 MHz.

6. An apparatus as recited in claim 1, additionally comprising means interconnecting a plurality said shaped electrodes to form an irradiation unit.

7. An apparatus as recited in claim 1, additionally comprising adjustment means for adjusting said vertical spacing between said shaped electrodes and said surface of said product to vary the intensity of irradiation of said product.

8. An apparatus as recited in claim 1, wherein said shaped electrodes each comprise a plurality of individual electrodes a base member-mounting said individual electrodes and adjustment means associated with each said individual electrode to vary the spacing of said electrode from said base and thereby to vary said spacing of said electrode from said product surface.

9. An apparatus as recited in claim 1, wherein the output power of said radio-frequency generator is controllable by said computer.

10. An apparatus as claimed in claim 1 wherein each said emitter means comprises a plurality of shaped electrodes disposed on one side of said first conveyor, run and directed towards said conveyor run and counterelectrode means disposed on the opposed side of said first conveyor run to said shaped electrodes and also directed towards said conveyor run, said shaped electrodes and counterelectrodes being combinable with one another.

11. An apparatus as recited in claim 6 wherein a single said radio-frequency generator is provided for each said irradiation unit.

12. An apparatus as recited in claim 1, wherein the said plurality of shaped electrodes are spaced from one another in a direction from said first end of said chamber to said second end, said spacing being dependent upon the length of the product to be treated.

13. An apparatus as recited in claim 1 wherein said electrodes are interchangeable by means of a detachable connection means.

* * * * *